United States Patent
Baumgartner (10) Patent No.: US 10,982,729 B2
(45) Date of Patent: *Apr. 20, 2021

(54) ADJUSTING DEVICE FOR A DISC BRAKE

(71) Applicant: KNORR-BREMSE Systeme fuer Nutzfahrzeuge GmbH, Munich (DE)

(72) Inventor: Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 49 days.

This patent is subject to a terminal disclaimer.

(21) Appl. No.: 15/865,704

(22) Filed: Jan. 9, 2018

(65) Prior Publication Data
US 2018/0128333 A1  May 10, 2018

Related U.S. Application Data

(63) Continuation of application No. PCT/EP2016/066378, filed on Jul. 11, 2016.

(30) Foreign Application Priority Data

Jul. 10, 2015  (DE) ..................... 10 2015 111 166.7

(51) Int. Cl.
*F16D 65/56* (2006.01)
*F16D 65/66* (2006.01)
(Continued)

(52) U.S. Cl.
CPC ......... *F16D 65/66* (2013.01); *F16D 65/0068* (2013.01); *F16D 65/18* (2013.01);
(Continued)

(58) Field of Classification Search
CPC ....... B61H 15/005; F16D 65/68; F16D 65/70; F16D 65/568; F16D 65/567; F16D 55/2255
See application file for complete search history.

(56) References Cited

U.S. PATENT DOCUMENTS 3,515,248 A    6/1970   Kyllonen
5,226,338 A *  7/1993   Reynolds ............... F16D 11/10
                                                    74/333

(Continued)

FOREIGN PATENT DOCUMENTS

CN    102384190 A    3/2012
CN    104271979 A    1/2015
(Continued)

OTHER PUBLICATIONS

Chinese-language Search Report issued in counterpart Chinese Application No. 201680047492.7 dated Dec. 12, 2018 with English translation (13 pages).

(Continued)

*Primary Examiner* — Bradley T King
*Assistant Examiner* — Stephen M Bowes
(74) *Attorney, Agent, or Firm* — Crowell & Moring LLP (57) ABSTRACT

A readjusting device is provided for compensating wear of a brake pad or multiple brake pads and/or a brake disc of a pneumatically actuatable disc brake for a vehicle. The readjusting device has a mechanical actuator, and the mechanical actuator converts a rotational movement of a brake lever into a rotational movement of a shaft. The shaft rotates at least one threaded spindle which acts on one of the brake pads. The readjusting device can carry out an advancing movement and a return movement of the threaded spindle, and the advancing movement and the return movement of the threaded spindle can be terminated by switching one or more couplings.

48 Claims, 2 Drawing Sheets

(51) Int. Cl.
*F16D 65/00* (2006.01)
*F16D 65/18* (2006.01)
*F16D 121/02* (2012.01)
*F16D 121/14* (2012.01)
*F16D 125/36* (2012.01)
*F16D 125/40* (2012.01)
*F16D 125/48* (2012.01)
*F16D 125/58* (2012.01)
*F16D 125/64* (2012.01)

(52) U.S. Cl.
CPC ...... *F16D 2121/02* (2013.01); *F16D 2121/14* (2013.01); *F16D 2125/36* (2013.01); *F16D 2125/40* (2013.01); *F16D 2125/48* (2013.01); *F16D 2125/582* (2013.01); *F16D 2125/64* (2013.01)

(56) References Cited

U.S. PATENT DOCUMENTS

| | | | | |
|---|---|---|---|---|
| 9,746,043 | B2* | 8/2017 | Asen | F16D 55/2255 |
| 2008/0028612 | A1* | 2/2008 | Shirokoshi | F16D 1/072 |
| | | | | 29/893.1 |
| 2014/0262634 | A1* | 9/2014 | Yamasaki | F16D 65/14 |
| | | | | 188/72.1 |
| 2015/0047929 | A1* | 2/2015 | Narula | F16D 65/092 |
| | | | | 188/71.8 |
| 2015/0068852 | A1 | 3/2015 | Weber et al. | |
| 2015/0176668 | A1* | 6/2015 | Miller | F16D 55/2255 |
| | | | | 701/70 |
| 2015/0192181 | A1 | 7/2015 | Asen et al. | |
| 2016/0017946 | A1* | 1/2016 | Sandberg | F16D 65/66 |
| | | | | 188/71.8 |
| 2016/0032996 | A1 | 2/2016 | Baumgartner et al. | |
| 2018/0119761 | A1* | 5/2018 | Baumgartner | F16D 65/567 |

FOREIGN PATENT DOCUMENTS

| | | | | |
|---|---|---|---|---|
| CN | 104395633 A | 3/2015 | | |
| DE | 10 2008 028 265 A1 | 12/2009 | | |
| DE | 10 2012 102 577 A1 | 9/2013 | | |
| DE | 102012006097 A1 * | 9/2013 | ........... | F16D 55/226 |
| DE | 10 2012 012 473 A1 | 12/2013 | | |
| DE | 102012012473 A1 * | 12/2013 | ............. | F16D 65/66 |
| DE | 10 2012 108 672 B3 | 2/2014 | | |
| DE | 102012108672 B3 * | 2/2014 | ......... | F16D 55/2255 |
| DE | 102012108676 B3 * | 2/2014 | ........... | F16D 55/226 |
| DE | 102012108682 A1 * | 3/2014 | ........... | F16D 55/226 |
| DE | 10 2013 006 863 A1 | 10/2014 | | |
| JP | 2014-190347 A | 10/2014 | | |
| WO | WO-2016046066 A1 * | 3/2016 | ......... | F16D 55/2255 |

OTHER PUBLICATIONS

International Search Report (PCT/ISA/210) issued in PCT Application No. PCT/EP2016/066378 dated Oct. 5, 2016 with English translation (five pages).

International Preliminary Report on Patentability (PCT/IB/326 & PCT/IB/373) issued in PCT Application No. PCT/EP2016/066378 dated Jan. 25, 2018, including English translation of document C2 (German-language Written Opinion (PCT/ISA/237)) previously filed on Jan. 9, 2018 (seven (7) pages).

* cited by examiner

ADJUSTING DEVICE FOR A DISC BRAKE

CROSS REFERENCE TO RELATED APPLICATIONS

This application is a continuation of PCT International Application No. PCT/EP2016/066378, filed Jul. 11, 2016, which claims priority under 35 U.S.C. § 119 from German Patent Application No. 10 2015 111 166.7, filed Jul. 10, 2015, the entire disclosures of which are herein expressly incorporated by reference.

BACKGROUND AND SUMMARY OF THE INVENTION

The present invention relates to a readjustment device for a pneumatically actuable disc brake for compensating for the wear of a brake pad or a plurality of brake pads and/or a brake disc of the pneumatically actuable disc brake, wherein the readjustment device has a mechanical actuator. The mechanical actuator converts a rotational movement of a brake lever into a rotational movement of a shaft, wherein the shaft sets at least one threaded spindle, which acts on one of the brake pads, into a rotatory movement.

Mechanically driven and mechanically acting readjustment devices which are provided for readjusting brake pads of pneumatically actuable disc brakes for a vehicle to compensate for the wear of the brake pads and brake discs are known from the prior art. They are driven during actuation of the brakes.

The term "air clearance" is repeatedly used below.

"Air clearance" means the spacing between brake pad and brake disc. A spacing between brake pad and brake disc is necessary so that in the "brake released" state, the brake disc can move completely freely and therefore unbraked.

A distinction is made here between the "design air clearance", that is to say the nominal, theoretical air clearance which is defined during the course of the structural design of a disc brake, and the "actual air clearance", the magnitude of which can be measured on a cold disc brake between brake pad and brake disc and is subject to tolerances, such that the magnitude thereof deviates from the magnitude of the design air clearance.

If only the term "air clearance" is used, this means the "actual air clearance". If the "design air clearance" is meant below, this term is also used.

Examples of mechanically driven and mechanically acting combined readjustment and resetting devices which can increase and reduce the air clearance in steps during actuations of the brakes are described by DE 10 2012 012 473 and DE 10 2012 102 577, for example.

Other mechanically driven and mechanically acting readjustment devices can reduce an enlarged air clearance during actuations of the brakes only synchronously with respect to the braking operation. In the case of an unwanted reduction in the air clearance below a desired value, they exploit existing reverse rotary effects on the threaded spindles, which act on the brake pads of the disc brake, in order to increase the air clearance in very small steps. When a desired air clearance value is reached, a further reverse rotary movement is stopped by a locking effect of the readjuster. This effect is potentially included in all known mechanically acting readjustment systems but is generally suppressed by high holding friction torques at the readjuster and/or at the spindle system in order to avoid unwanted changes in the air clearance, for example due to the effect of vibration in the driving mode.

In contrast to the bidirectional concepts described above for readjustment devices, reductions in the air clearance occurring spontaneously in the last example can be eliminated only with a very large number of actuations of the brakes. Such spontaneously occurring reductions in the air clearance can be brought about, for example, by severe vibrational stress occurring between two braking operations, incorrect air clearance adjustment, high-energy braking operations with a large increase in thickness of the brake disc and the brake pads.

DE 10 2013 006 863 A1 describes a disc brake with a bidirectional wear readjustment device, and a bidirectional wear readjustment device. The disc brake in DE 10 2013 006 863 A1 with a bidirectional wear readjustment device is designed in such a manner that an increased resetting speed of the bidirectional wear readjustment device and improved resistance in relation to the effect of wear and vibration is provided. However, the disadvantage of the active principle on the basis of holding friction torques at the readjuster and/or at the spindle system remains.

The invention is therefore based on the object of providing a mechanical readjustment device for a disc brake that avoids the aforementioned disadvantages of the prior art.

The invention achieves the object by providing a readjustment device for compensating for the wear of a brake pad or a plurality of brake pads and/or a brake disc of the pneumatically actuable disc brake, wherein the readjustment device has a mechanical actuator. The mechanical actuator converts a rotational movement of a brake lever into a rotational movement of a shaft, wherein the shaft sets at least one threaded spindle, which acts on one of the brake pads, into a rotatory movement. The readjustment device can carry out an advancing stroke and a reverse rotary stroke of the threaded spindle, wherein the advancing stroke and the reverse rotary stroke of the threaded spindle can be terminated by switching of one or more couplings.

According to the invention, it is provided that the readjustment device can carry out an advancing stroke and a reverse rotary stroke of the threaded spindle, wherein the advancing stroke and the reverse rotary stroke of the threaded spindle can be terminated by switching of one or more couplings.

As a result, the readjustment device is advantageously capable of, in addition to an advancing stroke with a defined magnitude, also carrying out a resetting stroke with a defined magnitude.

In a preferred embodiment of the invention, the magnitude of the reverse rotary stroke of the readjustment device is defined by a defined spacing h between a ramp starting point and a ramp end point or ramp switching point in the vertical direction, wherein the spacing h is defined in a defined operating state of the readjustment device.

As a result, the magnitude of the design air clearance of the readjustment device or of the disc brake is defined in an advantageous manner by a spacing—that is to say a directly measurable component variable—of a component that must be manufacturable with high precision, or on geometry formations of said component, which can likewise be manufactured with high precision.

As a result, the tolerance-increasing influence of only indirectly measurable component characteristic variables, such as, for example, coefficients of stiction or sliding friction or stiction torques, on the resetting stroke and thus on the magnitude of the air clearance of the readjustment device is particularly advantageously avoided.

Such a definition of the resetting stroke and thus of the design air clearance of the readjustment device has a particularly advantageous effect if the spacing is defined in an operating state of the readjustment device that is simple to define, as is the case in the present invention. Such an operating state is simply and thus advantageously defined in that, in said operating state, the brake pads of the disc brake are caused by the readjustment device to just make contact with the brake disc.

In a further advantageous variant embodiment, the readjustment device has a transmission with a stepped gearwheel, where the stepped gearwheel has a switchable coupling. By means of the switchable coupling, the readjustment device can simply and advantageously be brought into a basic position after the exchange of worn brake pads and/or a worn brake disc.

In a further advantageous variant embodiment, the readjustment device has a shaft which forms a spline toothing section. The spline toothing section is operatively connected to a spline toothing hub in a drive disc. In this way, a positively locking shaft-hub connection which is of structural-space-saving design and which is thus advantageously axially displaceable under load is formed.

In a further advantageous variant embodiment, the readjustment device has a sleeve or a spring sleeve, by means of which the introduced torque of the quick-acting threaded shaft is transmitted to output elements via transmission elements, to an internal profile of an output wheel. In this way, a rotationally conjoint coupling of the sleeve to the output wheel is formed. In addition, this type of coupling forms a cardanic joint, as a result of which it is advantageously possible for possible tilting or precession movements of a threaded spindle, which converts the torque into a translationally acting force, to be compensated for.

In a further advantageous variant embodiment, the readjustment device has a first ball ramp coupling and a second ball ramp coupling. Through the use of ball ramp couplings, it is possible for different torque paths, as required for the functioning of the readjustment device, to be switched in a simple and structural-space-saving and thus advantageous manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
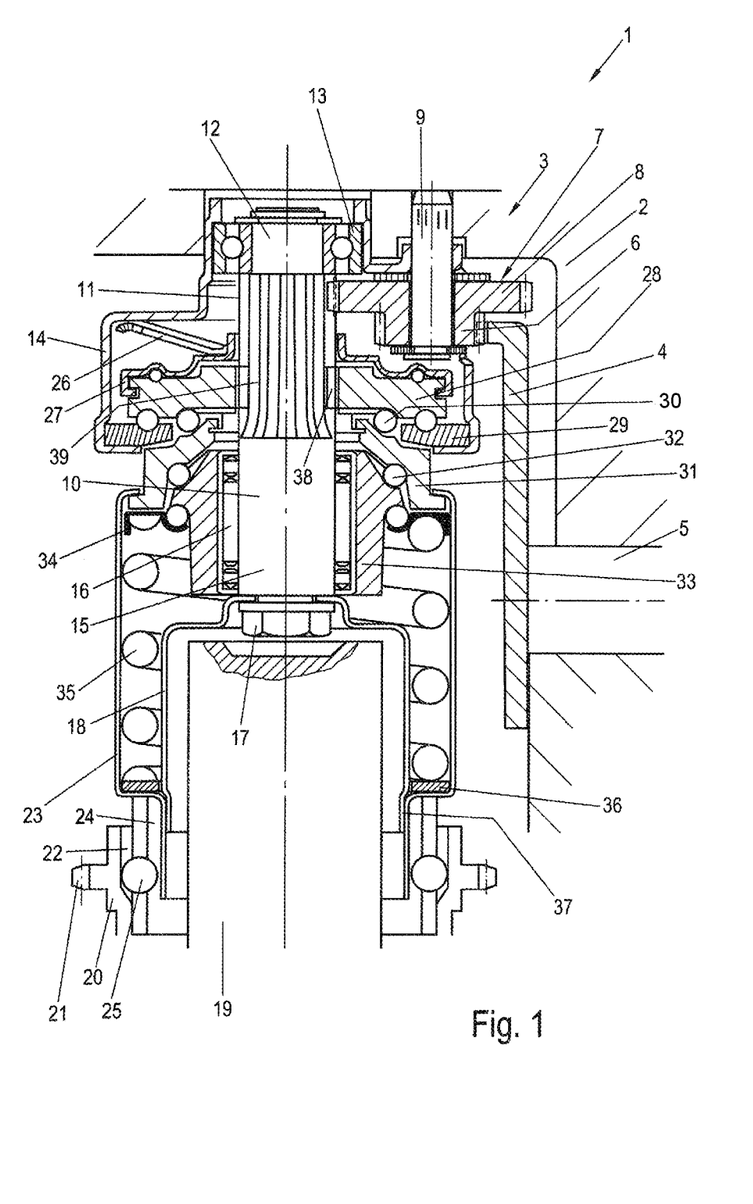
FIG. 1 is a schematic diagram of a front view of the readjustment device in section.

FIG. 1 illustrates a readjustment device 1 according to the invention in section. The readjustment device 1 is installed in a brake caliper 2 of a disc brake.

The readjustment device 1 has an actuator device 3 which is formed here as a mechanical actuator device 3. By means of the mechanical actuator device 3, the readjustment device 1 is activated synchronously with the actuation of the brakes.

The actuator device 3 has a transmission which is formed here as a two-stage spur gear transmission. Alternatively, other constructional forms of transmissions and/or fewer or more than two transmission stages are also possible.

The transmission has a crown wheel toothed segment 4. The crown wheel toothed segment 4 is operatively connected to the actuation of the brakes or to a brake lever 5 of an application mechanism of the disc brake. The crown wheel toothed segment 4 has a toothing which is formed, for example, as an involute toothing. Other toothing geometries are alternatively also possible. The toothing of the crown wheel toothed segment 4 meshes with a toothing of a pinion section 6 of a stepped gearwheel 7. In addition to the pinion section 6, the stepped gearwheel 7 also has a toothed wheel section 8. The stepped gearwheel 7 is mounted rotatably on an axle 9. The axle 9 is inserted into a corresponding bore in the brake caliper 2 for conjoint rotation.

The toothing of the crown wheel toothed segment 4 can be brought out of engagement. As a result, the readjustment device 1 can simply and advantageously be brought into a basic position after exchange of worn brake pads and/or a worn brake disc without the kinematics of the readjustment device 1 having to be appropriately designed for this purpose or without a special torque path having to be provided for this purpose in the readjustment device 1. Construction space is thus saved in an advantageous manner.

Alternatively, for reaching the basic position of the readjustment device 1 after exchange of worn brake pads and/or a worn brake disc, the stepped gearwheel 7 can be provided with a switchable coupling (not illustrated here), and therefore, when the coupling is released, the pinion section 6 of the stepped gearwheel 7 is rotatable independently of the wheel section 8 of the stepped gearwheel 7.

The transmission has a shaft 10. The shaft 10 has a toothed pinion section 11. The toothing of the pinion section 11 meshes with the toothing of the wheel section 8 of the stepped gearwheel 7.

The crown wheel toothed segment 4, the stepped gearwheel 7 and the pinion section 11 of the shaft 10 therefore form the two-stage spur gear transmission. The spur gear transmission converts a relatively small angle of rotation of the crown wheel toothed segment 4 into a greater angle of rotation of the shaft 10 about an overall transmission ratio of the spur gear transmission in a particularly structural-space-saving and therefore advantageous manner (also see FIG. 2 in this respect).

The shaft 10 has a spline toothing section 39. The spline toothing section 39 of the shaft 10 is operatively connected to a spline toothing hub 38 in a drive disc 28. In this way, a positively locking shaft-hub connection which is of structural-space-saving design and which is thus advantageously axially displaceable under load is formed.

The shaft 10 furthermore has, on its side facing away from the brake pad or the brake pads (not illustrated here), a bearing section 12, by means of which the shaft 10 is mounted rotatably in the brake caliper 2 via a bearing. The bearing is formed here as a deep groove ball bearing 13. Alternatively, other constructional forms of a bearing are also possible.

The brake caliper 2 has a corresponding housing opening or housing bore, into which here a housing 14 is inserted, into which in turn the deep groove ball bearing 13 is inserted and fixed in an axial direction toward the positive y direction with respect to the coordinate system in FIG. 1. Alternatively, the deep groove ball bearing 13 can also be fixed differently in an axial direction, for example by means of a securing ring.

The shaft 10 has a freewheel section 15. The freewheel section 15 extends through the hub of a freewheel 16. The freewheel 16 can be formed, for example, as a clamping roller freewheel.

The shaft 10 has, at its end facing away from the bearing section 12, an axially central internal threaded blind hole. A hexagon screw 17 is inserted into the internal threaded blind hole. A sleeve 18 is fastened to the shaft 10 by the hexagon screw 17. The sleeve 18 adjoins the shaft 10 coaxially in the negative y direction with respect to the coordinate system in FIG. 1. The sleeve 18 has a bell-shaped cross section.

The readjustment device 1 has at least one threaded spindle 19. The threaded spindle 19 adjoins the shaft 10 coaxially in the negative y direction with respect to the coordinate system in FIG. 1, and acts via a thrust piece on the brake pads (not illustrated here) of the disc brake. The threaded spindle 19 protrudes, with its end facing toward the shaft 10, at least partially into the sleeve 18.

The readjustment device 1 preferably has at least one output wheel 20. The output wheel 20 has an internal thread which is operatively connected to an external thread of the threaded spindle 19. In this way, a second threaded drive is formed, which converts the torque of the shaft 10 into a translationally acting force, which acts for example via a thrust piece (not illustrated here), on the at least one brake pad or on the brake disc of the disc brake.

Optionally, the output wheel 20 can also be connected rotationally conjointly to the threaded spindle 19. In such a situation, the second threaded drive is formed by the threaded spindle 19 and by an internal thread, for example in a thrust piece (not illustrated here, see DE 10 2012 108 672 B3, FIG. 6, reference sign 6e) or the internal thread in a pad plate of the brake pad or the internal thread in a further component (not illustrated here, see DE 10 2012 108 672 B3, FIG. 6, reference sign 8).

The output wheel 20 optionally has a synchronization device 21. Said synchronization device 21, which is formed here by way of example as a sprocket toothing, which guides a wraparound drive with a chain for the synchronization of the rotational movement of the threaded spindle 19 with an optionally provided second threaded spindle 19 (not illustrated), which can likewise act directly or via a thrust piece on the brake pad. Alternatively, other synchronization device 21 are also possible, for example an involute toothing, which then meshes with the toothing of an intermediate wheel, which is in turn operatively connected to a further output wheel 20. The output wheel 20 furthermore has an internal profile 22. The internal profile 22 is designed here, for example, in the manner of a toothing profile.

The readjustment device 1 furthermore has a spring sleeve 23. The spring sleeve 23 is arranged coaxially with respect to the shaft 10. The spring sleeve 23 has, on its circumference, a plurality of output elements 24 which are each molded integrally onto the spring sleeve 23. The output element 24 is designed here by way of example in the manner of a toothing profile.

The torque, introduced in the spring sleeve 23, of the shaft 10 is transmitted by the output elements 24 via transmission elements 25, which are formed here by way of example as balls, to the internal profile 22 of the output wheel 20. This forms a rotationally conjoint coupling of the spring sleeve 23 to the output wheel 20. In addition, this type of coupling forms a cardanic joint, as a result of which it is advantageously possible for possible tilting or precession movements of the at least one threaded spindle 19, which converts the torque of the shaft 10 into a translationally acting force, to be compensated for.

The readjustment device 1 has a spring 26. The spring 26 is designed here as a disc spring or membrane spring. Alternatively, other constructional forms of springs are also possible. The spring 26 is supported with its outer edge or its end in a positive y direction with respect to the coordinate system in FIG. 1 in the housing 14. The spring 26 is supported with its inner edge or its end in a negative y direction with respect to the coordinate system in FIG. 1 on an upper bearing ring 27 of an axial ball bearing.

The upper bearing ring 27 forms, with the drive disc 28 and rolling bodies, which are in this case in the form of balls, a first rolling bearing, by means of which the drive disc 28 is rotatably mounted. The drive disc 28 has, on its upper face side or on its side in the positive y direction with respect to the coordinate system in FIG. 1, a corresponding channel in which the rolling bodies of the first rolling bearing of the drive disc 28 roll. The upper bearing ring 27 is fastened to the drive disc 28 at the circumference of the latter and, for this purpose, engages in a corresponding groove.

A second rolling bearing, by means of which the drive disc 28 is rotatably mounted, is formed by a bearing ring and rolling bodies, which are in this case likewise in the form of balls, of a switching coupling 29. The switching coupling 29 is designed as a ball ramp coupling and accordingly has a ramp (not illustrated here). The ramp has a defined spacing h between a ramp starting point and a ramp end point or ramp switching point in the vertical direction or in the positive y direction with respect to the coordinate system in FIG. 1, wherein the spacing h is defined in a defined operating state of the readjustment device.

This operating point is defined by virtue of the brake pad being caused by the readjustment device 1 to just make contact with the brake disc of the disc brake.

The drive disc 28 has, on its lower face side or on its side in the negative y direction with respect to the coordinate system in FIG. 1, a corresponding channel in which the rolling bodies of the second rolling bearing or of the switching coupling 29 of the drive disc 28 roll. The bearing ring of the switching coupling 29 is fastened at its circumference in the housing 14 in a positively locking manner and, for this purpose, engages in a corresponding housing groove.

The housing 14 therefore surrounds the spur gear transmission and the drive disc 28 having the upper bearing ring, and also surrounds the spring 26, which is supported with its outer edge or its end in the positive y direction with respect to the coordinate system in FIG. 1 in the housing 14, and the switching coupling 29 which is fastened at its circumference in a positively locking manner and, for this purpose, engages in a corresponding housing groove. The housing 14 engages with a corresponding geometry formation, such as, for example, a housing lug or a cylindrical housing projection, into the opening or bore of the brake caliper 3 and is held in the opening or bore, for example, by means of a press fit.

The drive disc 28 has, on its lower face side, on its side in the negative y direction with respect to the coordinate system in FIG. 1, a cylindrical depression. The transition between the base of the depression and the side surface has a radius. The radius forms a running surface of the rolling bodies of a first ball ramp coupling 30. The counterpart running surface of the first ball ramp coupling 30 is formed by a conical projection of an output disc 31.

The output disc 31 has a bell-shaped cross section. The output disc 31 furthermore has a central bore through which the shaft 10 extends. However, the output disc 31 and the shaft 10 have at no direct torque-proof shaft-hub connection, and therefore the output disc 31 is rotated independently of the rotational movement of the shaft 10.

The bell-shaped output disc 31 has a radius on its inner side. The radius forms a running surface of the rolling bodies of a second ball ramp coupling 32.

The counterpart running surface of the second ball ramp coupling 32 is formed by a conical projection of a freewheel outer ring 33. The freewheel outer ring 33 forms, together with the freewheel section 15 of the shaft 10 and the freewheel 16, a coupling which acts only in one direction of rotation.

Through the use of ball ramp couplings 30, 32, it is possible for different torque paths, as are required for the function of the readjustment device 1, to be switched easily and in a structural-space-saving and thus advantageous manner.

The freewheel outer ring 33 has a further radius on its circumferential surface. Said radius forms, with a centering ring 34 and rolling bodies, which in this case are in the form of balls, a rolling bearing, by means of which the freewheel outer ring 33 is rotatably mounted.

A preload spring 35 is supported on the centering ring 34. The preload spring 35 is a helical torsion spring with a cylindrical cross section. The preload spring 35 extends between the centering ring 34 and a further centering ring 36 which is arranged coaxially with respect to the shaft 10 and, with respect to the centering ring 34, in the negative y direction with respect to the coordinate system in FIG. 1. The centering ring 36 is inserted into the spring sleeve 23.

The spring sleeve 23 engages with a projection around a geometrically corresponding collar of the output disc 31 and is connected rotationally conjointly to the output disc 31. The spring sleeve 23 surrounds the preload spring 35 and forms an opening at its lower end or in the negative y direction with respect to the coordinate system in FIG. 1.

The spring sleeve 23 is connected rotationally conjointly to the sleeve 18 at sleeve projection 37.

The function of the readjustment device 1 will be explained below on the basis of three operating states of the readjustment device 1 (also see FIG. 2 for this purpose):
  air clearance correct
  air clearance too large
  air clearance too small.

Figure 2:
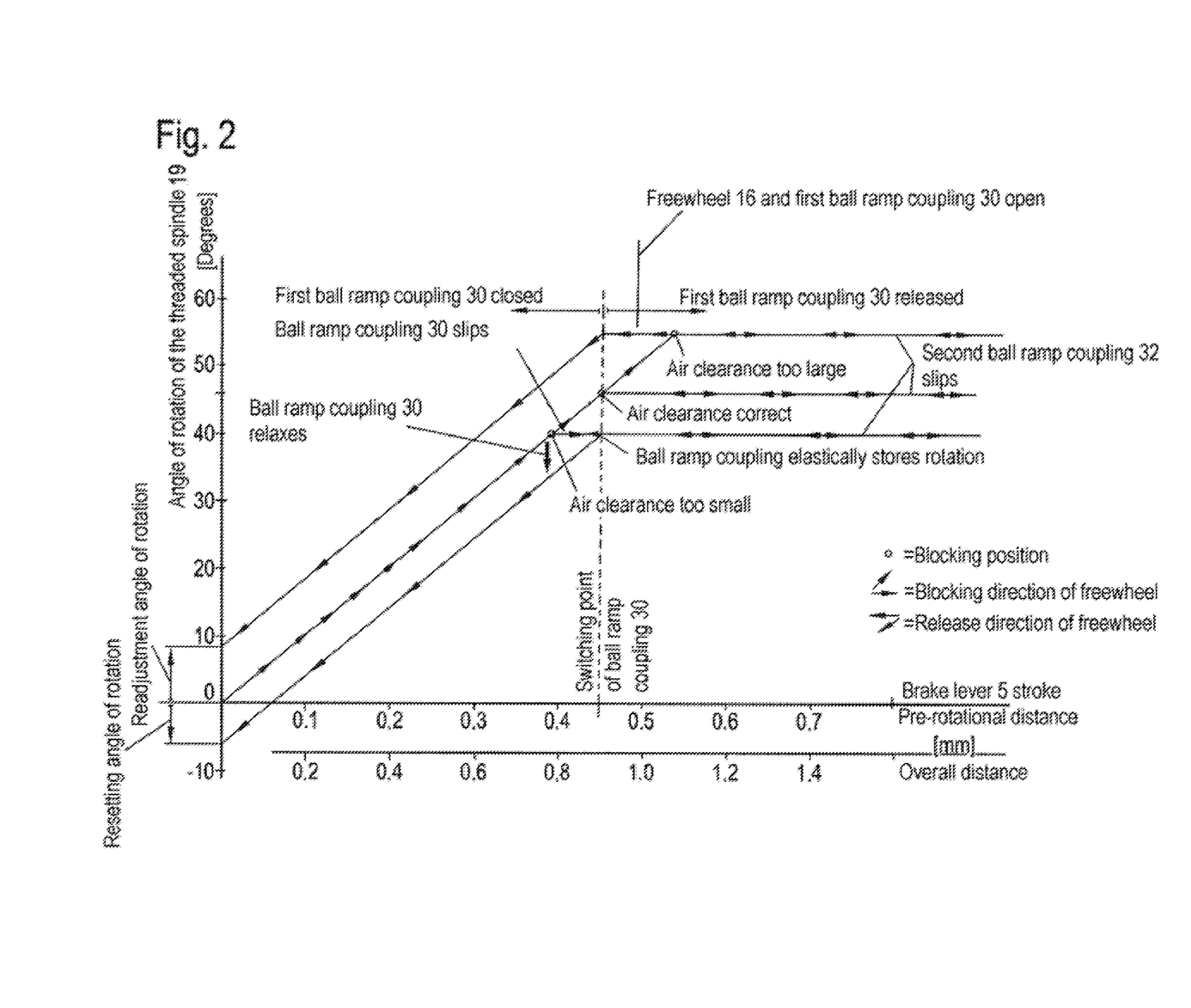
FIG. 2 is a kinematic diagram for illustrating the function of the readjustment device.

The brake lever 5 and the crown wheel toothed segment 4 connected thereto are in an inoperative position. The drive disc 28 is in an end position closed by the first ball ramp coupling 30 and the bearing balls of the switching coupling 29 lie against the end stops of the raceways of the ramp of the switching coupling 29.

When the brake lever 5 is actuated, the brake lever 5, with its pivoting stroke, carries out the stroke movement of the at least one threaded spindle 19 and at the same time as the pivoting of the crown wheel toothed segment 4 brings about the advancing rotational movement of the shaft 10 via the stepped gearwheel 7. The drive disc 28 is entrained in said rotational movement by means of the pinion toothing hub 38.

The balls of the switching coupling 29 roll on the lower step of the raceways of their switching ramp, as a result of which the first ball ramp coupling 30 initially still remains closed and therefore transmits the movement of the drive disc 28.

Simultaneously and therefore synchronously with the drive disc 28, the pre-rotational movement of the shaft 10 is transmitted via the unidirectional clamping action of the freewheel 16 and via the closed second ball ramp coupling 32 of the output disc 31 to the at least one threaded spindle 19. The rotational movement of the at least one threaded spindle 19 is blocked, and therefore what is referred to as the ramp switching point is reached. This operating state of the readjustment device 1 is defined by the brake pads of the disc brake coming into contact with the brake disc.

In this position, the first ball ramp coupling 30 is opened by the switching ramp. By means of the pre-rotational movement which has taken place, the air clearance is reduced by 50% when the blocking position is reached. The overcoming of the rest of the air clearance until blocking occurs has taken place by means of the stroke movement.

As the actuating movement of the brake lever 5 progresses further, the rotational movement, which is introduced via the crown wheel toothed segment 4, of the shaft 10 is not transmitted to the at least one threaded spindle 19 in the case of an aerated first ball ramp coupling 30 and slipping second ball ramp coupling 32.

When the disc brake is released, the brake lever 5 is moved back and reduces the tensioning force of the disc brake until the blocking of the at least one threaded spindle 19 is removed. At the same time, the crown wheel toothed segment 4 actuates the shaft 1 via the stepped gearwheel 7 in a reverse-rotating direction. Said reverse rotary movement is not transmitted because of the at least one threaded spindle 19 which is still blocked and the released first ball ramp coupling 30 and the freewheel 16 which in this situation is loaded in the release direction.

The blocking of the at least one threaded spindle 19 is released and the ramp switching point is reached:
the brake lever 5 is moved back further and, in the process, produces part of the air clearance. At the same time, the brake lever 5 drives the shaft 10 via the crown wheel toothed segment 4 and the stepped gearwheel 7 in the reverse-rotating direction. In this state, the first ball ramp coupling 30 is closed, as a result of which the resetting movement is transmitted to the at least one threaded spindle 19 and therefore the pre-rotational movement which has taken place during the actuation is reversed. The starting state of the readjustment device 1 is therefore reached again.

In the event of actuation of the brakes when the air clearance is too large, the starting state arises as described above for a correct air clearance.

Accordingly, the brake lever 5 and the crown wheel toothed segment 4 connected thereto are in an inoperative position. The drive disc 28 is in an end position closed by the first ball ramp coupling 30, and the bearing balls of the switching coupling 29 lie against the end stops of the raceways of the ramp of the switching coupling 29.

When the brake lever 5 is actuated, the brake lever 5, with its pivoting stroke, carries out the stroke movement of the at least one threaded spindle 19 and at the same time as the pivoting of the crown wheel toothed segment 4 brings about the advancing rotational movement of the shaft 10 via the stepped gearwheel 7. The drive disc 28 is then entrained in said rotational movement by the pinion toothing hub 38.

The balls of the switching coupling 29 roll on the lower side of the raceways of their switching ramp, as a result of which the first ball ramp coupling 30 initially still remains closed, and therefore the movement of the drive disc 28 is transmitted.

At the same time and therefore synchronously with the drive disc 28, the pre-rotational movement of the shaft 10 is transmitted via the unidirectional clamping action of the freewheel 16 and via the closed second ball ramp coupling 32 of the output disc 31 to the at least one threaded spindle 19.

When the ramp switching point is reached, if the air clearance is too large the at least one threaded spindle 19 is rotated further by means of the unidirectional clamping action of the freewheel 16 whilst the first ball ramp coupling 30 is aerated. The readjustment operation takes place here as with the correct air clearance.

The further procedure of the readjustment operation follows as after the blocking of the at least one threaded spindle 19 when the air clearance is correct.

Accordingly, the rotational movement of the at least one threaded spindle 19 is blocked, and therefore what is referred to as the ramp switching point is reached. This operating state of the readjustment device 1 is defined by the brake pads of the disc brake coming into contact with the brake disc.

In this position, the first ball ramp coupling 30 is opened by the switching ramp. By means of the pre-rotational movement which has taken place, the air clearance is reduced by 50% when the blocking position is reached. The overcoming of the remaining air clearance until blocking occurs has taken place by means of the stroke movement.

As the actuating movement of the brake lever 5 progresses further, the rotational movement, introduced via the crown wheel toothed segment 4, of the shaft 10 is not transmitted to the at least one threaded spindle 19 in the case of an aerated first ball ramp coupling 30 and slipping second ball ramp coupling 32.

When the disc brake is released, the brake lever 5 is moved back and reduces the tensioning force of the disc brake until the blocking of the at least one threaded spindle 19 is removed. At the same time, the crown wheel toothed segment 4 actuates the shaft 1 via the stepped gearwheel 7 in a reverse-rotating direction. Said reverse rotary movement is not transmitted because of the at least one threaded spindle 19 which is still blocked and the released first ball ramp coupling 30 and the freewheel 16 which is loaded in the release direction in this situation.

The blocking of the at least one threaded spindle 19 is released and the ramp switching point is reached: the brake lever 5 is moved back further and, in the process, produces part of the air clearance. At the same time, the brake lever 5 drives the shaft 10 via the crown wheel toothed segment 4 and the stepped gearwheel 7 in the reverse-rotating direction. In this state, the first ball ramp coupling 30 is closed, as a result of which the resetting movement is transmitted to the at least one threaded spindle 19, and therefore the pre-rotational movement which has taken place during the actuation is reversed. The starting state of the readjustment device 1 is therefore reached again.

In the case of an actuation of the brakes when the air clearance is too small, the starting state arises as described above for a correct air clearance.

Accordingly, the brake lever 5 and the crown wheel toothed segment 4 which is connected thereto are in an inoperative position. The drive disc 28 is in an end position closed by the first ball ramp coupling 30, the bearing balls of the switching coupling 29 lie against the end stops of the raceways of the ramp of the switching coupling 29.

When the brake lever 5 is actuated, the brake lever 5, with its pivoting stroke, carries out the lifting movement of the at least one threaded spindle 19 and at the same time as the pivoting of the crown wheel toothed segment 4 brings about the advancing rotational movement of the shaft 10 via the stepped gearwheel 7. The drive disc 28 is entrained in said rotational movement by the pinion toothing hub 38.

The balls of the switching coupling 29 roll on the lower step of the raceways of their switching ramp, as a result of which the first ball ramp coupling 30 initially still remains closed and therefore the movement of the drive disc 28 is transmitted.

At the same time and therefore synchronously with the drive disc 28, the pre-rotational movement of the shaft 10 is transmitted via the unidirectional clamping action of the freewheel 16 and via the closed second ball ramp coupling 32 of the output disc 31 to the at least one threaded spindle 19.

The at least one threaded spindle 19 is blocked by the at least one brake pad coming into contact with the brake disc. The ramp switching point is not yet reached. The further pre-rotational movement is not transmitted as a result of the slipping of the first ball ramp coupling 16 and the second ball ramp coupling 17. The first ball ramp coupling 16 slips until the ramp switching point is reached, and is then aerated. The ramp switching point is synchronized here with the blocking position of the spindles. By this means, the deviation in the air clearance is compensated for during the reverse stroke. The brake is released.

The further procedure until the starting state is reached is as when the air clearance is correct.

Accordingly, when the disc brake is released, the brake lever 5 is moved back and reduces the tensioning force of the disc brake until the blocking of the at least one threaded spindle 19 is removed. At the same time, the crown wheel toothed segment 4 actuates the shaft 1 via the stepped gearwheel 7 in the reverse-rotating direction. Said reverse rotary movement is not transmitted because of the at least one threaded spindle 19 which is still blocked and the released first ball ramp coupling 30 and the freewheel 16 which is loaded in the release direction in this situation.

The blocking of the at least one threaded spindle 19 is released and the ramp switching point is reached: the brake lever 5 is moved back further and, in the process, produces part of the air clearance. At the same time, the brake lever 5 drives the shaft 10 via the crown wheel toothed segment 4 and the stepped gearwheel 7 in the reverse-rotating direction. In this state, the first ball ramp coupling 30 is closed, as a result of which the resetting movement is transmitted to the at least one threaded spindle 19 and therefore the pre-rotational movement which has taken place during the actuation is reversed. The starting state of the readjustment device 1 is therefore reached again.

After exchange of worn brake pads, the resetting movement of the readjustment device 1 back into a basic position takes place by disengaging the toothing of the crown wheel toothed segment 4 from the toothing of the pinion section 6 of the stepped gearwheel 7. Alternatively, this can also take place by actuation of the coupling which is installed in the stepped gearwheel 7.

LIST OF REFERENCE SIGNS

1 Readjustment device
2 Brake caliper
3 Actuator device
4 Crown wheel toothed segment
5 Brake lever
6 Pinion section
7 Stepped gearwheel
8 Wheel section
9 Axle
10 Shaft
11 Pinion section
12 Bearing section
13 Deep groove ball bearing
14 Housing
15 Freewheel section
16 Freewheel
17 Hexagon screw
18 Sleeve
19 Threaded spindle
20 Output wheel
21 Synchronization device
22 Internal profile 23 Spring sleeve
24 Drive element
25 Transmission element
26 Spring
27 Bearing ring, top
28 Drive disc
29 Switching coupling
30 Ball ramp coupling
31 Output disc
32 Ball ramp coupling
33 Freewheel outer ring
34 Centering ring
35 Preload spring
36 Centering ring
37 Projection
38 Spline toothing hub
39 Spline toothing section
40 Internal thread The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A readjustment device for compensating wear of one or more brake pads and/or a brake disc of a pneumatically actuable disc brake for a vehicle, the readjustment device comprising:
   a mechanical actuator is configured to convert a rotational movement of a brake lever into a rotational movement of a shaft, wherein the shaft rotates at least one threaded spindle, which acts on one of the brake pads, into a rotatory movement, the at least one threaded spindle being arranged concentric with the shaft, wherein
   the readjustment device is configured to carry out during brake application an advancing stroke of a first threaded spindle of the at least one threaded spindle when an air clearance between the brake disc and one of the one or more brake pads is greater than a predetermined air clearance and a reverse rotary stroke of the first threaded spindle when an air clearance between the brake disc and one of the one or more brake pads is smaller than a predetermined air clearance, the advancing stroke and the reverse rotary stroke of the first threaded spindle being terminable by one or more ball ramp couplings of the readjustment device of the first threaded spindle switching between a torque-transmitting mode and a non-torque-transmitting mode.

2. The readjustment device as claimed in claim 1, wherein
   a magnitude of the reverse rotary stroke of the readjustment device is defined by a defined spacing h between two geometry formations of the readjustment device, and
   the spacing h is defined in a defined operating state of the readjustment device.

3. The readjustment device as claimed in claim 2, wherein the defined operating state is defined by virtue of the brake pad being caused by the readjustment device to just make contact with the brake disc of the disc brake.

4. The readjustment device as claimed in claim 2, wherein the geometry formations which define the spacing h are a ramp starting point and a ramp end point or ramp switching point of a switching coupling.

5. The readjustment device as claimed in claim 4, wherein the mechanical actuator has a transmission.

6. The readjustment device as claimed in claim 5, wherein the transmission is a spur gear transmission.

7. The readjustment device as claimed in claim 5, wherein the transmission is a two-stage transmission.

8. The readjustment device as claimed in claim 5, wherein the transmission has a crown wheel toothed segment and a stepped gearwheel.

9. The readjustment device as claimed in claim 8, wherein the crown wheel toothed segment can be brought out of engagement with a pinion section of the stepped gearwheel.

10. The readjustment device as claimed in claim 8, wherein
    the shaft has a pinion section, wherein the pinion section is operatively connected to the wheel section of the stepped gearwheel.

11. The readjustment device as claimed in claim 8, wherein
    the shaft has a spline toothing section, wherein the spline toothing section is operatively connected to a spline toothing hub.

12. The readjustment device as claimed in claim 11, wherein
    the shaft has a bearing section by which the shaft is mounted rotatably in a housing via a bearing.

13. The readjustment device as claimed in claim 12, wherein
    the bearing is a deep groove ball bearing.

14. The readjustment device as claimed in claim 13, wherein
    the brake caliper has an opening or bore in which the housing is inserted and fixed in an axial direction.

15. The readjustment device as claimed in claim 14, wherein
    the bearing is fixed in an axial direction by a shoulder of the housing.

16. The readjustment device as claimed in claim 12, wherein
    the shaft has a freewheel section, and the freewheel section of the shaft extends through the hub of a freewheel.

17. The readjustment device as claimed in claim 16, wherein
    an end of the shaft facing away from the bearing section has an axially central internal threaded blind hole into which a hexagon screw is inserted, by which a center sleeve is fastened to the shaft.

18. The readjustment device as claimed in claim 17, wherein
    the center sleeve coaxially adjoins the shaft.

19. The readjustment device as claimed in claim 18, wherein
    the first threaded spindle protrudes, with its end facing toward the shaft, at least partially into the center sleeve.

20. The readjustment device as claimed in claim 11, wherein
    the readjustment device has a drive disc.

21. The readjustment device as claimed in claim 20, wherein
    the drive disc has the spline toothing hub.

22. The readjustment device as claimed in claim 20, wherein
    an upper bearing ring forms, with the drive disc and rolling bodies, a first rolling bearing, by which the drive disc is rotatably mounted.

23. The readjustment device as claimed in claim 22, wherein the drive disc has, on its upper face side, a channel in which the rolling bodies of the first rolling bearing of the drive disc roll.

24. The readjustment device as claimed in claim 23, wherein
the upper bearing ring is fastened to the drive disc at the circumference of the latter and engages in a corresponding groove.

25. The readjustment device as claimed in claim 24, wherein
a second rolling bearing, by which the drive disc is rotatably mounted, is formed by a plurality of rolling bodies and the switching coupling.

26. The readjustment device as claimed in claim 25, wherein
the drive disc has, on its lower face side, a channel in which the rolling bodies of the second rolling bearing of the drive disc roll.

27. The readjustment device as claimed in claim 26, wherein
the drive disc has, on its lower face side, a cylindrical depression, wherein a transition between the base of the depression and the side surface of the depression has a cylindrical depression radius.

28. The readjustment device as claimed in claim 27, wherein
the cylindrical depression radius forms a running surface of the rolling bodies of a first of the one or more couplings, wherein the first coupling is a first ball ramp coupling of the one or more ball ramp couplings.

29. The readjustment device as claimed in claim 28, wherein
the counterpart running surface of the first ball ramp coupling is formed by a conical projection of an output disc.

30. The readjustment device as claimed in claim 29, wherein
the output disc has a bell-shaped cross section.

31. The readjustment device as claimed in claim 30, wherein
the output disc furthermore has a central bore through which the shaft extends.

32. The readjustment device as claimed in claim 31, wherein
the output disc has an output disc radius on its inner side.

33. The readjustment device as claimed in claim 32, wherein
the output disc radius forms a running surface of the rolling bodies of a second ball ramp coupling of the one or more couplings.

34. The readjustment device as claimed in claim 33, wherein
the counterpart running surface of the second ball ramp coupling is formed by a conical projection of a freewheel outer ring.

35. The readjustment device as claimed in claim 34, wherein
the freewheel outer ring forms, together with the freewheel section of the shaft and the freewheel, a freewheel coupling which permits rotation of the shaft relative to the first threaded spindle in one direction of rotation and blocks rotation of the shaft relative to the first threaded spindle in an opposite direction of rotation.

36. The readjustment device as claimed in claim 35, wherein
a preload spring is supported on a centering ring, wherein the preload spring is a helical torsion spring.

37. The readjustment device as claimed in claim 36, wherein
the preload spring extends between the centering ring and a further centering ring which is arranged coaxially with respect to the shaft, wherein the centering ring is inserted in a spring sleeve.

38. The readjustment device as claimed in claim 37, wherein
the spring sleeve has, on its circumference, a plurality of output elements which are each molded integrally onto the spring sleeve, wherein the output elements are each formed in the manner of a toothing profile.

39. The readjustment device as claimed in claim 38, wherein
torque, introduced into the spring sleeve, of the shaft is transmitted by the output elements via transmission elements to an internal profile of an output wheel.

40. The readjustment device as claimed in claim 37, wherein
the spring sleeve engages with a projection around a geometrically corresponding collar of the output disc and is connected rotationally conjointly to the output disc.

41. The readjustment device as claimed in claim 40, wherein
the spring sleeve surrounds the preload spring and has an opening at its lower end, wherein the spring sleeve is connected rotationally conjointly to a center sleeve.

42. The readjustment device as claimed in claim 41, wherein
the readjustment device has at least one output wheel.

43. The readjustment device as claimed in claim 42, wherein
the output wheel is connected rotationally conjointly to the first threaded spindle.

44. The readjustment device as claimed in claim 42, wherein
the output wheel has a synchronization device.

45. The readjustment device as claimed in claim 44, wherein
the synchronization device is formed as a sprocket toothing or as an involute toothing.

46. The readjustment device as claimed in claim 45, wherein
the output wheel has an internal profile, wherein the internal profile is a toothing profile.

47. The readjustment device as claimed in claim 46, wherein
the output wheel has an internal thread which is operatively connected to an external thread of the first threaded spindle, and a spindle drive is thus formed.

48. The readjustment device as claimed in claim 47, wherein
the spindle drive converts a torque of the threaded shaft into a translationally acting force which acts on the at least one brake pad or on the brake disc of the disc brake.

* * * * *